(12) United States Patent
Chen

(10) Patent No.: US 10,935,798 B2
(45) Date of Patent: Mar. 2, 2021

(54) FIELD-OF-VIEW TRANSFORMATION STRUCTURE OF HEAD-MOUNTED MAGNIFYING-GLASS

(71) Applicant: Chung-Liang Chen, New Taipei (TW)

(72) Inventor: Chung-Liang Chen, New Taipei (TW)

( * ) Notice: Subject to any disclaimer, the term of this patent is extended or adjusted under 35 U.S.C. 154(b) by 135 days.

(21) Appl. No.: 16/172,874

(22) Filed: Oct. 29, 2018

(65) Prior Publication Data

US 2019/0137768 A1 May 9, 2019

(30) Foreign Application Priority Data

Nov. 3, 2017 (TW) ................. 10613809.7

(51) Int. Cl.
| | | |
|---|---|---|
| *G02B 15/14* | (2006.01) | |
| *G02B 27/22* | (2018.01) | |
| *G02B 27/14* | (2006.01) | |
| *G02B 27/02* | (2006.01) | |
| *G02B 27/01* | (2006.01) | |
| *G02B 25/00* | (2006.01) | |

(Continued)

(52) U.S. Cl.
CPC .......... *G02B 27/027* (2013.01); *G02B 5/045* (2013.01); *G02B 17/045* (2013.01); *G02B 25/004* (2013.01); *G02B 25/007* (2013.01); *G02B 27/0172* (2013.01); *G02B 27/0176* (2013.01); *G02B 2027/0123* (2013.01); *G02B 2027/0154* (2013.01); *G02B 2027/0161* (2013.01); *G02B 2027/0169* (2013.01)

(58) Field of Classification Search
CPC .............. G02B 15/173; G02B 27/0172; G02B 27/0149; G02B 27/145; G02B 27/143; G02B 27/0101; G02B 27/017; G02B 27/2214; G02B 27/01; B43L 13/18; G08B 5/002; G09G 3/003; B60T 8/172

USPC ....... 359/676, 630–636, 462, 466, 639, 629, 359/626, 404, 407, 13–14; 345/7–9; 349/11, 15; 701/1; 310/49 R; 340/980, 340/815.74

See application file for complete search history.

(56) References Cited

U.S. PATENT DOCUMENTS

| | | | |
|---|---|---|---|
| 5,870,166 A * | 2/1999 | Chang .................... | G02B 7/002 351/158 |
| 6,704,142 B2 * | 3/2004 | Caplan .................. | G02B 7/002 351/158 |

* cited by examiner

*Primary Examiner* — Dawayne Pinkney
(74) *Attorney, Agent, or Firm* — Leong C. Lei

(57) ABSTRACT

A field-of-view transformation structure of a head-mounted magnifying-glass comprises: a wearing-piece, a supporting-assembly, a first pivoting-portion, a magnifying-glass main-body, a first prism main-body, and a second prism main-body; wherein the supporting-assembly is set with the wearing-piece, the first pivoting-portion is defined on the supporting-assembly, the magnifying-glass main-body and the first pivoting-portion are pivotally set mutually, a first facing-eye-surface is defined on the first prism main-body corresponding to the magnifying-glass main-body, and a second facing-eye-surface is defined on a offset position of the magnifying-glass main-body; thus, the user can wear the wearing-piece, when wanting using the first prism main-body to watch, the magnifying-glass main-body can be flipped upwards; or, the user can directly view the second facing-eye-surface to simultaneously watch other parts of the patient when watching the magnifying-glass main-body. Besides the magnified field-of-view is bigger than the conventional technology, it also has the advantage of wide-angle field-of-view.

7 Claims, 16 Drawing Sheets

(51) Int. Cl.
*G02B 5/04* (2006.01)
*G02B 17/04* (2006.01)

FIELD-OF-VIEW TRANSFORMATION STRUCTURE OF HEAD-MOUNTED MAGNIFYING-GLASS

TECHNICAL FIELD OF THE INVENTION

The present invention provides a flippable magnifying-glass main-body to change the field-of-view; and further has the advantage of being able to use the second prism main-body to watch another field-of-view while using the magnifying-glass main-body to achieve the field-of-view transformation structure of a head-mounted magnifying-glass with multiple field-of-view to freely transform.

DESCRIPTION OF THE PRIOR ART

The Republic of China Patent No. M557831 "A device of a head-mounted magnifying-glass", the main structure comprises a head fixing device; at least one prism main-body which is adjacent to one side of the user's eye and has a predetermined spacing for changing the user's eyesight direction to create a prism field-of-view; and a magnifying-glass main-body set on one side of the facing-object-surface of the prism main-body for magnifying the image size of the target object to generate a magnified field-of-view in the prism field-of-view.

Thereby, the user can watch the object under the eyesight-line in a non-head-down state; and the user can simultaneously see the field-of-view viewed by the magnifying-glass main-body from the prism field-of-view through the magnifying-glass main-body; and so as to increase the convenience of wearing use and avoid the dizziness caused by transferring the eyesight-line.

However, although the above-mentioned allows the user to view the lower-side field-of-view in a non-head-down state; since the user's eyesight-line first enters into the prism main-body and then enters into the magnifying-glass main-body, which means that the setting position of the magnifying-glass main-body is farther away from the user; as a result, the target is magnified by the magnified field-of-view when watching the field-of-view, but it is relatively smaller for the whole user's watching eyesight-line; which will make the user more difficult to watch, and will further lead to the fatigue, harm, and loss on the eye after a long-term watching.

SUMMARY OF THE INVENTION

The main objective of the present invention is lied in: The magnifying-glass main-body can be flipped through the first pivoting-portion to allow the user being able to select directly viewing the first facing-eye-surface to watch a prism field-of-view by the first prism main-body; or through the magnifying-glass main-body to watch; in addition, when using the magnifying-glass main-body, the user can also simultaneously move the eye field-of-view to directly view the second facing-eye-surface of the second prism main-body and watch another prism field-of-view, so as to achieve the advantage of freely transforming field-of-view.

The main objective of the present invention is lied in: The positional relationship between the magnifying-glass main-body and the first prism main-body allows the user to watch the magnified field-of-view in the magnifying-glass main-body more clearly because the magnifying-glass main-body is closer to the user's eye than the prior art; such that the area of the magnified field-of-view is larger to allow the user to watch more clearly.

The main structure of the present invention to achieve the above-mentioned objectives comprises a wearing-piece for the user to wear on the head which is connected and set with a supporting-assembly; wherein a first pivoting-portion is defined on the supporting-assembly, and the first pivoting-portion is pivotally set with a magnifying-glass main-body for approaching the eye of the user to proceed watching; wherein a plurality of first prism main-bodies are respectively set on the supporting-assembly and located at one side of the magnifying-glass main-body facing away from the wearing-piece, and a first facing-eye-surface defined by the first prism main-body and corresponded to the magnifying-glass main-body is cooperatedly set; wherein a plurality of second prism main-bodies are respectively set at one side of each of the first prism main-bodies, which the second prism main-body is defined with a second facing-eye-surface disposed offset from magnifying-glass main-body.

When wanting to use the head-mounted magnifying-glass of the present invention, the user can use the wearing-piece to wear it on the head, and then choose whether to use the magnifying-glass main-body according to the requirement. If it is not necessary, the first pivoting-portion can be used to flip it upwards to allow the eye field-of-view to directly view the first facing-eye-surface or the second facing-eye-surface; so as to clearly watch the face or other parts of the patient in a non-head-down state. If the magnifying-glass main-body is to be used, the first pivoting-portion can be used to flip the magnifying-glass main-body downwards, so that the first facing-eye-surface corresponding to the magnifying-glass main-body forms a magnified field-of-view, which can allow the user to watch the magnified part of the patient by using the magnified field-of-view. At the same time, the second facing-eye-surface can be viewed by using the residual light of the eye or by directly moving the eye, and a bigger and wider field-of-view than the first prism main-body can be observed through the second prism main-body; and the magnifying-glass main-body is closer to the user's eye, which can allow the user to watch the magnified field-of-view more clearly.

The conventional technology above-described in the prior art of the present invention allows the user to view the lower-side field-of-view in a non-head-down state; since the user's eyesight-line first enters into the prism main-body and then enters into the magnifying-glass main-body, which means that the setting position of the magnifying-glass main-body is farther away from the user; as a result, the target is magnified by the magnified field-of-view when watching the field-of-view, but it is relatively smaller for the whole user's watching eyesight-line; which will make the user more difficult to watch and is very inconvenient overall.

By applying the above technology of the present invention, the above-mentioned problems of the conventional technology can be broken through, and so as to achieve the practicality and progressiveness of the present invention having advantages as described above.

DETAILED DESCRIPTION OF THE PREFERRED EMBODIMENTS

The following descriptions are exemplary embodiments only, and are not intended to limit the scope, applicability or configuration of the invention in any way. Rather, the following detailed description provides a convenient illustration for implementing exemplary embodiments of the invention. Various changes to the described embodiments may be made in the function and arrangement of the elements described without departing from the scope of the invention as set forth in the appended claims.

The foregoing and other aspects, features, and utilities of the present invention will be best understood from the following detailed description of the preferred embodiments when read in conjunction with the accompanying drawings.

Figure 1:
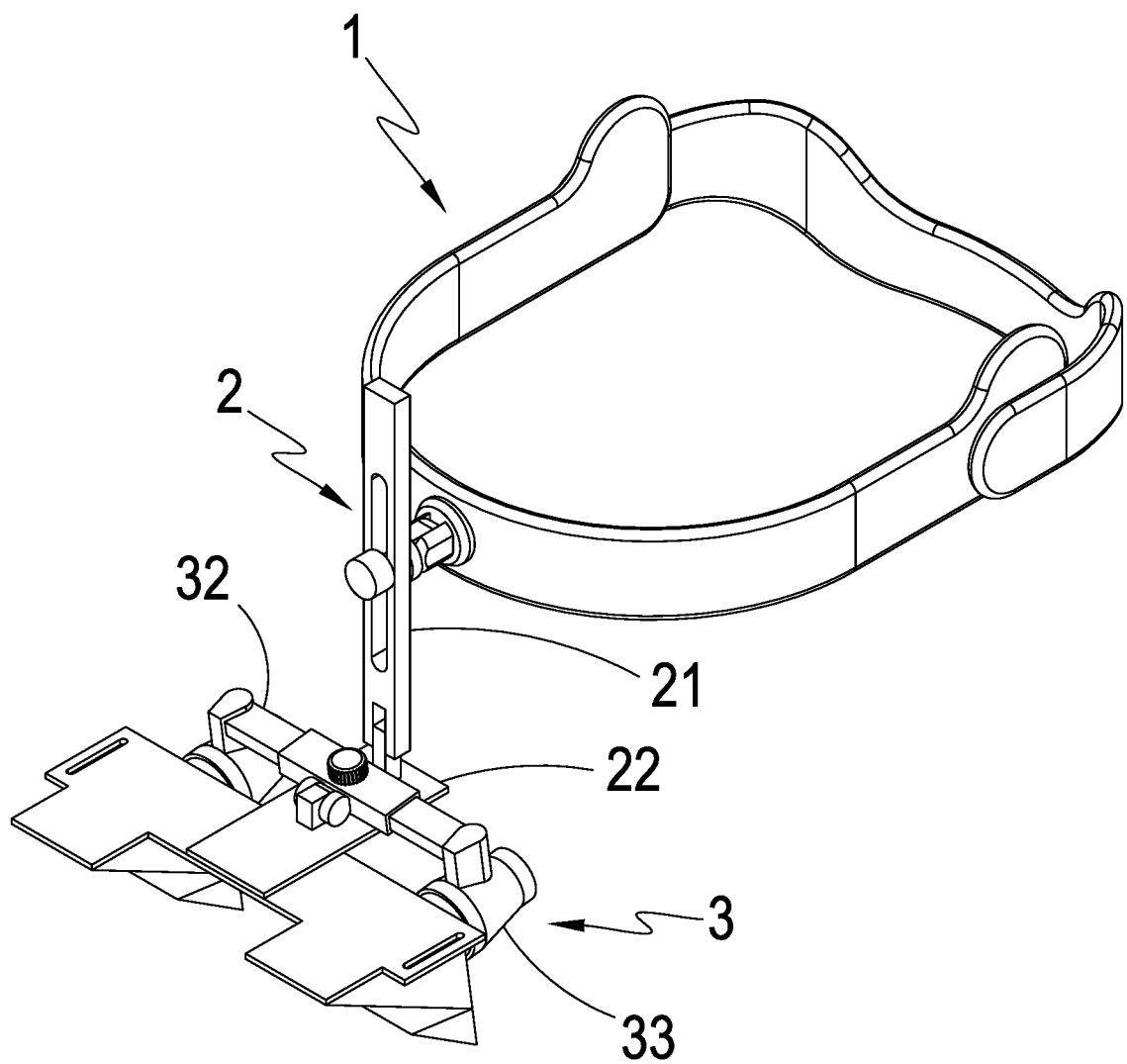
FIG. 1 is a perspective view of the preferred embodiment.

Please refer to FIG. 1 to FIG. 3, the present invention comprises: a wearing-piece 1 for the user to wear on the head; a supporting-assembly 2 connected and set with the wearing-piece 1; wherein the supporting-assembly 2 comprises a first bracket-body 21, a second bracket-body 22 connected and set with the first bracket-body 21, and the second bracket-body 22 has a first pivoting-portion 23 and a first prism body 4 which will be described below; a first pivoting-portion 23 defined on the supporting-assembly 2; a magnifying-glass main-body 3 provided for approaching the eye of the user to proceed watching, which is pivoted and set with the first pivoting-portion 23 for the user to flip; wherein the magnifying-glass main-body 3 comprises a magnifying-glass shell-body 31, a plurality of extending-retracting pieces 32 movably set on the magnifying-glass shell-body 31, and a plurality of magnifying-glass-bodies 33 respectively set at two ends of the extending-retracting pieces 32, and one side of the magnifying-glass shell-body 31 has a second pivoting-portion 34 provided for the first pivoting-portion 23 to pivotally set; a plurality of first prism main-bodies 4 respectively set on the supporting-assembly 2 and located at one side of the magnifying-glass main-body 3 facing away from the wearing-piece 1; which define a first facing-eye-surface 41 corresponding to the magnifying-glass main-body 3 to cooperatedly set; and a plurality of second prism main-bodies 5 respectively set at one side of the first prism main-body 4, which define a second facing-eye-surface 51 disposed offset from magnifying-glass main-body 3; wherein the connecting-setting way between the first prism body 4 and the second prism body 5 can be one of sticking-fixing or clamping-fixing.

In addition, for the first prism main-body 4, the angle between the bottom-edge 4b and the short-edge 4a is 90 degrees to 120 degrees; the angle between the bottom-edge 4b and the oblique-edge 4c is 20 degrees to 32 degrees; and the angle between short-edge 4a and the oblique-edge 4c is 45 degrees to 65 degrees. In addition, for the second prism main-body 5, the angle between the bottom-edge 5b and the short-edge 5a is 90 degrees to 120 degrees; the angle between the bottom-edge 5b and the oblique-edge 5c is 20 degrees to 32 degrees; and the angle between short-edge 5a and the oblique-edge 5c is 45 degrees to 65 degrees. The above dimensions and angles are not limited, other dimensions and angles are all within the protection scope of the present invention. In short, the above angles are only embodiments of various feasible solutions, and are not intended to limit the angles of the present invention.

Figure 5:
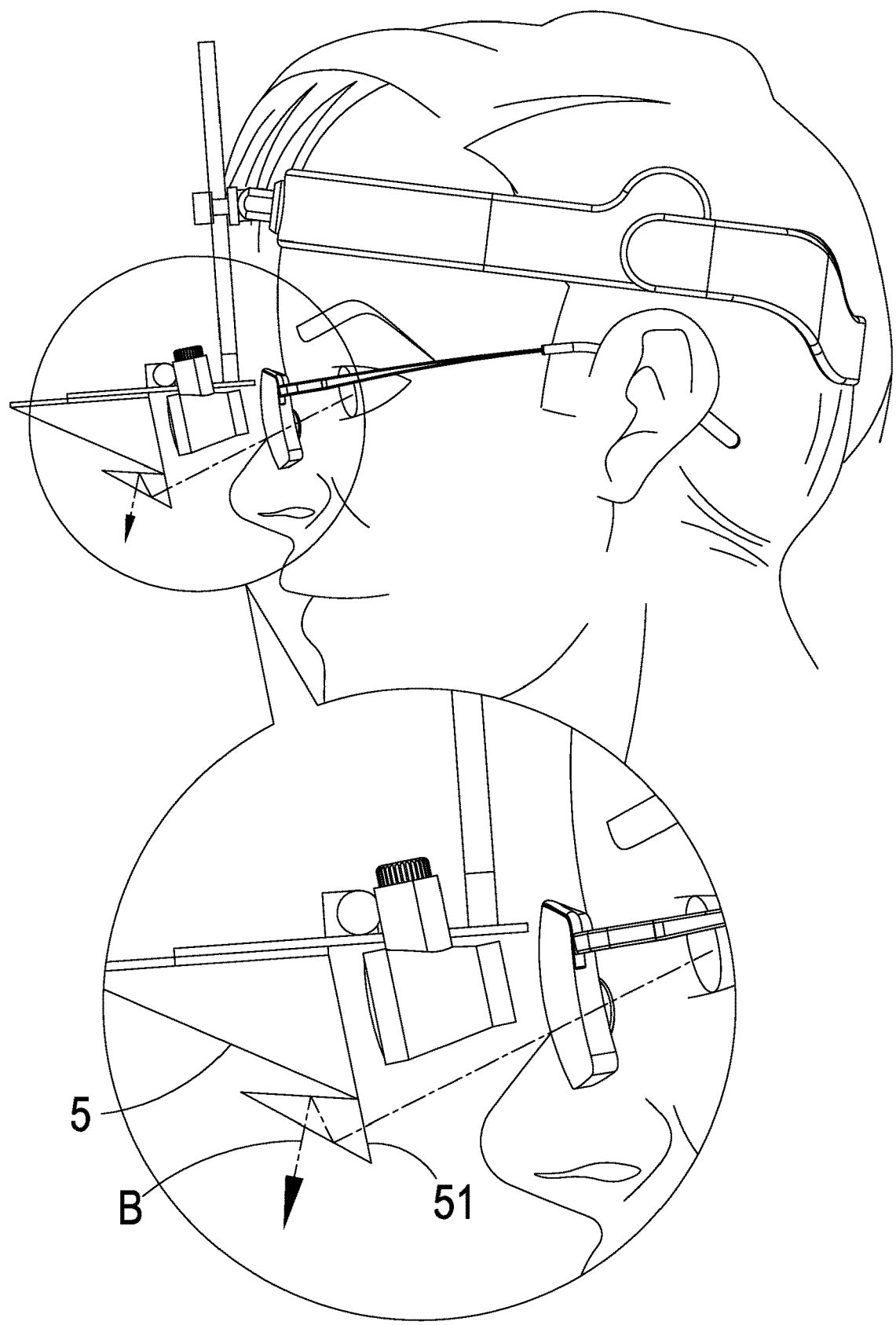
FIG. 5 is a use schematic diagram of the second prism main-body of the preferred embodiment.
Figure 5A:
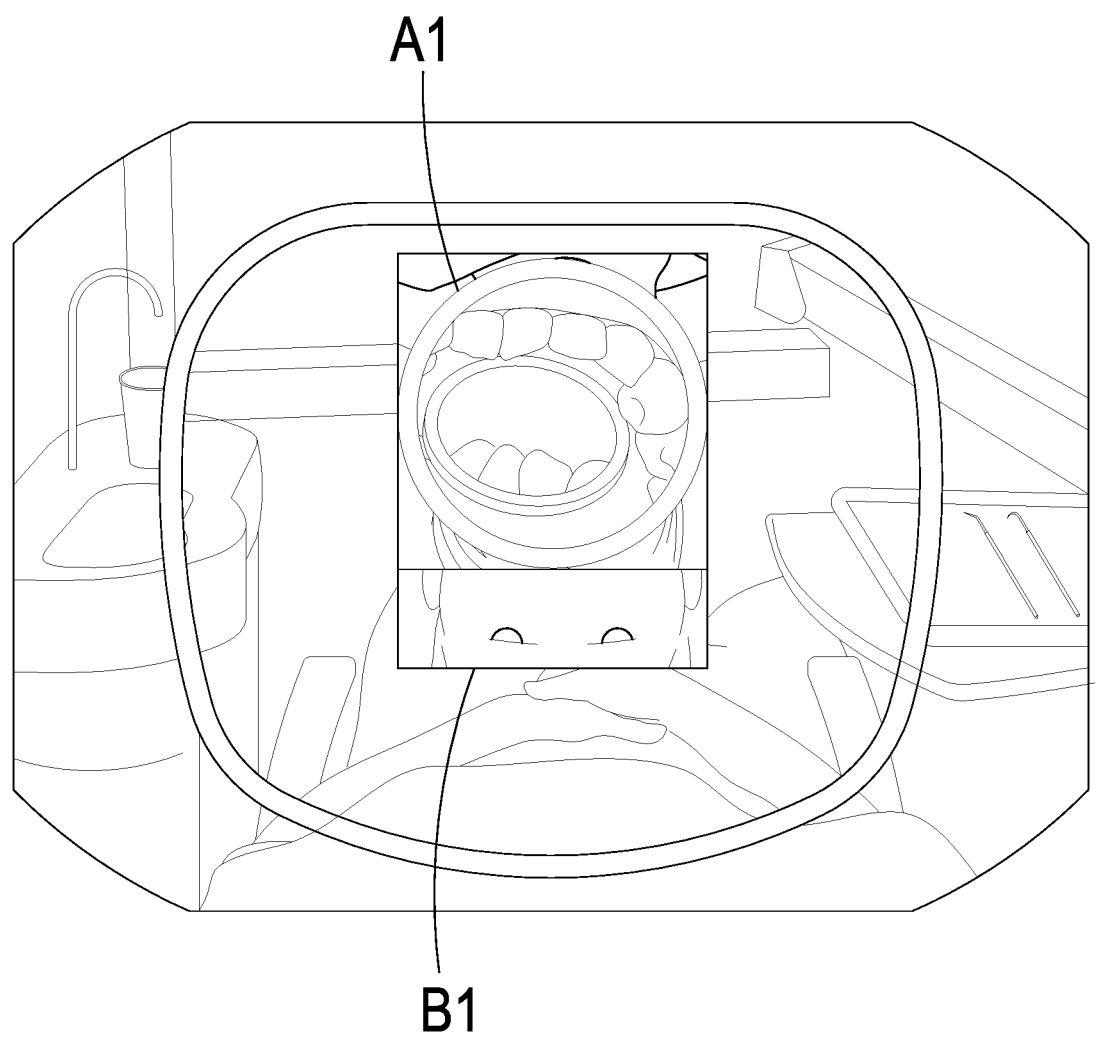
FIG. 5A is a comprehensive field-of-view diagram of the preferred embodiment.

Please simultaneously refer to FIG. 1 to FIG. 6A, the wearing-piece 1 allows the user to wear on the head for easy use; and the user can watch the patient-part to be magnified through the magnifying-glass main-body 3. Briefly, please simultaneously refer to FIG. 4, the user's field-of-view route A passes through the magnifying-glass main-body 3 first, and then passes through the first facing-eye-surface 41 and the first prism main-body 4 in sequence to obtain a magnified field-of-view A1 as shown in FIG. 5A. Similarly, please simultaneously refer to FIG. 5, in the case of using the magnifying-glass main-body 3, the eye can also be rotated to move the field-of-view downward, so that the field-of-view route B can directly watch the second facing-eye-surface 51 of the second prism main-body 5 to achieve watching other patient-part in the non-amplified area; so to obtain a wide-angle field-of-view B1 such as the patient eye, which is shown in FIG. 5A. Please further simultaneously refer to FIG. 5A, from the first-person perspective of the user to see; it can be seen that the magnified field-of-view A1 of the field-of-view route A and the wide-angle field-of-view B1 of the field-of-view route B can be simultaneously watched.

Figure 6:
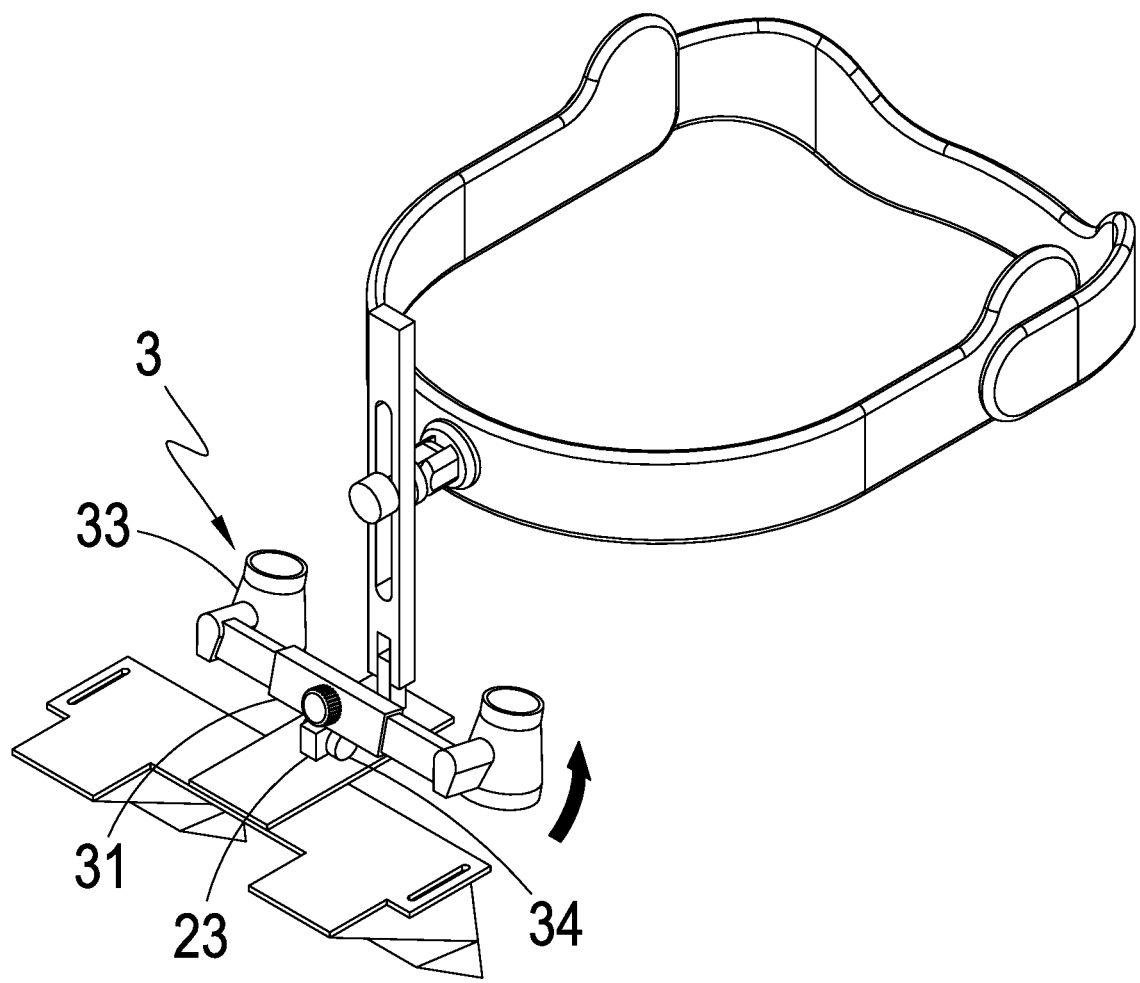
FIG. 6 is a schematic diagram of the flipping magnifying-glass main-body of the preferred embodiment.
Figure 6A:
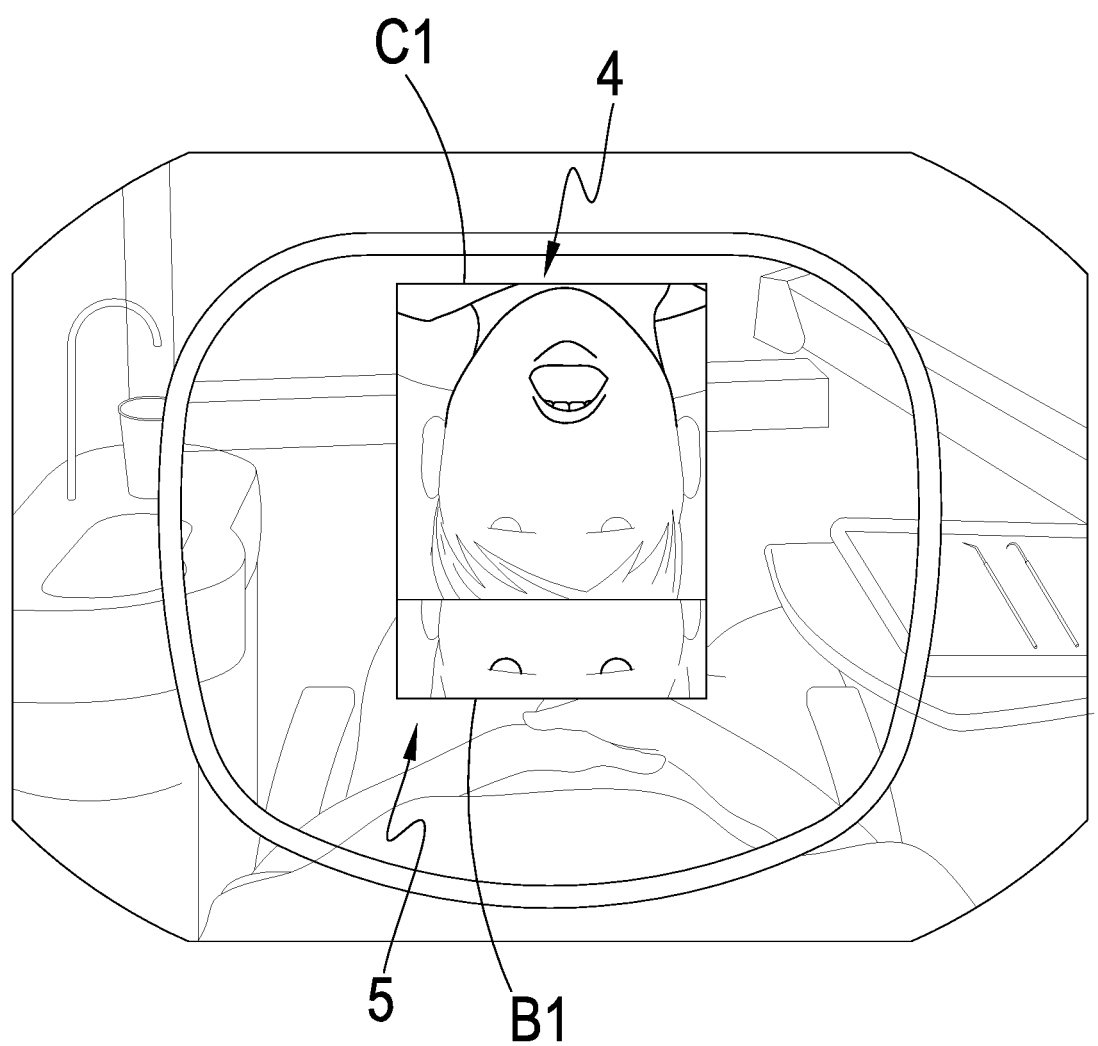
FIG. 6A is a prism field-of-view diagram of the preferred embodiment.

In addition, when the user does not need to use the magnifying-glass main-body 3, the magnifying-glass shell-body 31 or the magnifying-glass-body 33 can be held by the pivoting technology of the first pivoting-portion 23 and the second pivoting-portion 34 to apply force to flip the magnifying-glass main-body 3 to achieve the flip function (as shown in FIG. 6). Please simultaneously refer to FIG. 6A, when the magnifying-glass main-body 3 is flipped, the viewing-angle viewed by the user is shown in FIG. 6A; which the prism field-of-view C1 of the first prism main-body 4 and the wide-angle field-of-view B1 can be simultaneously watched.

Figure 7:
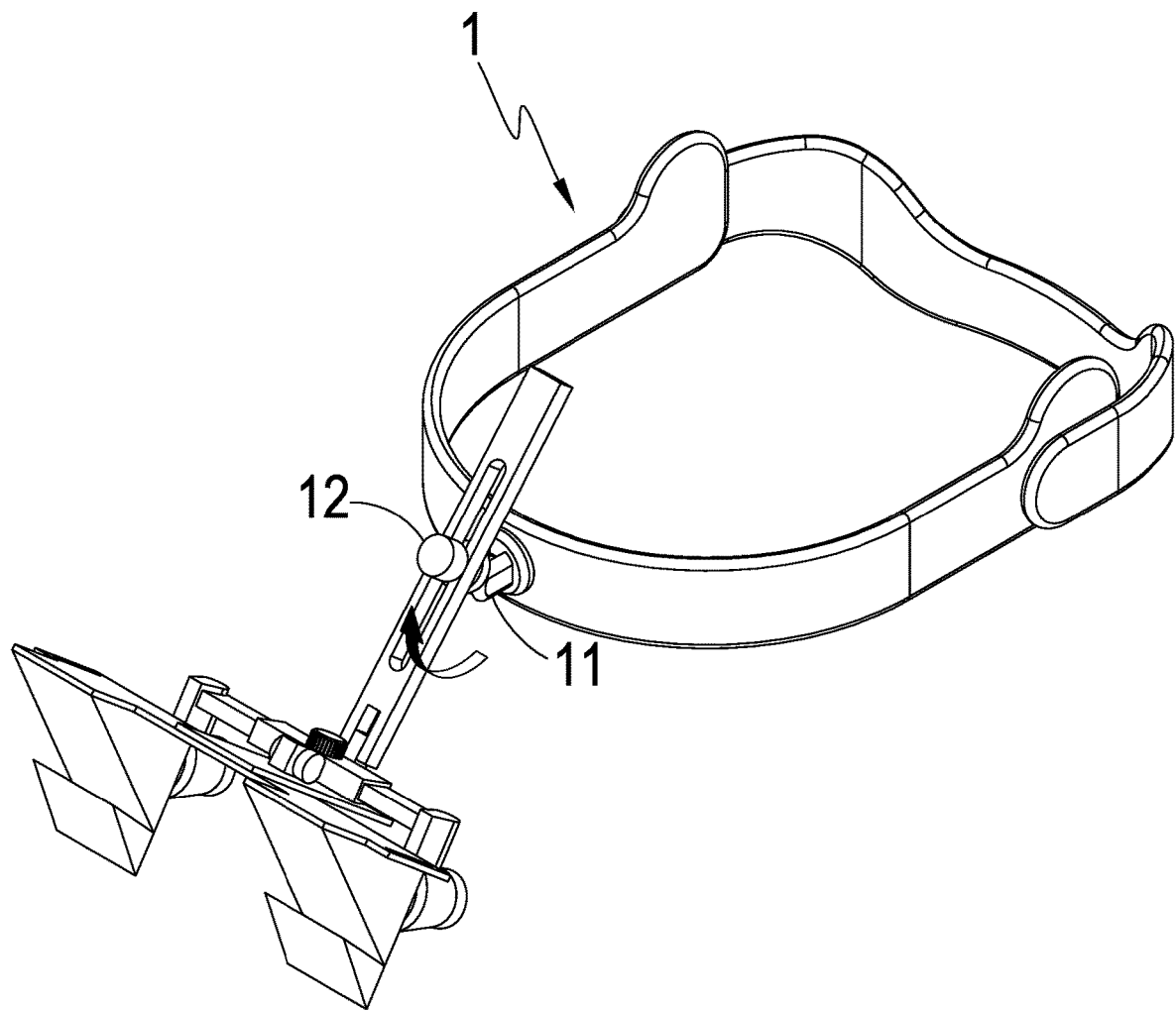
FIG. 7 is an adjustment positioning-piece schematic diagram 1 of the preferred embodiment.
Figure 7A:
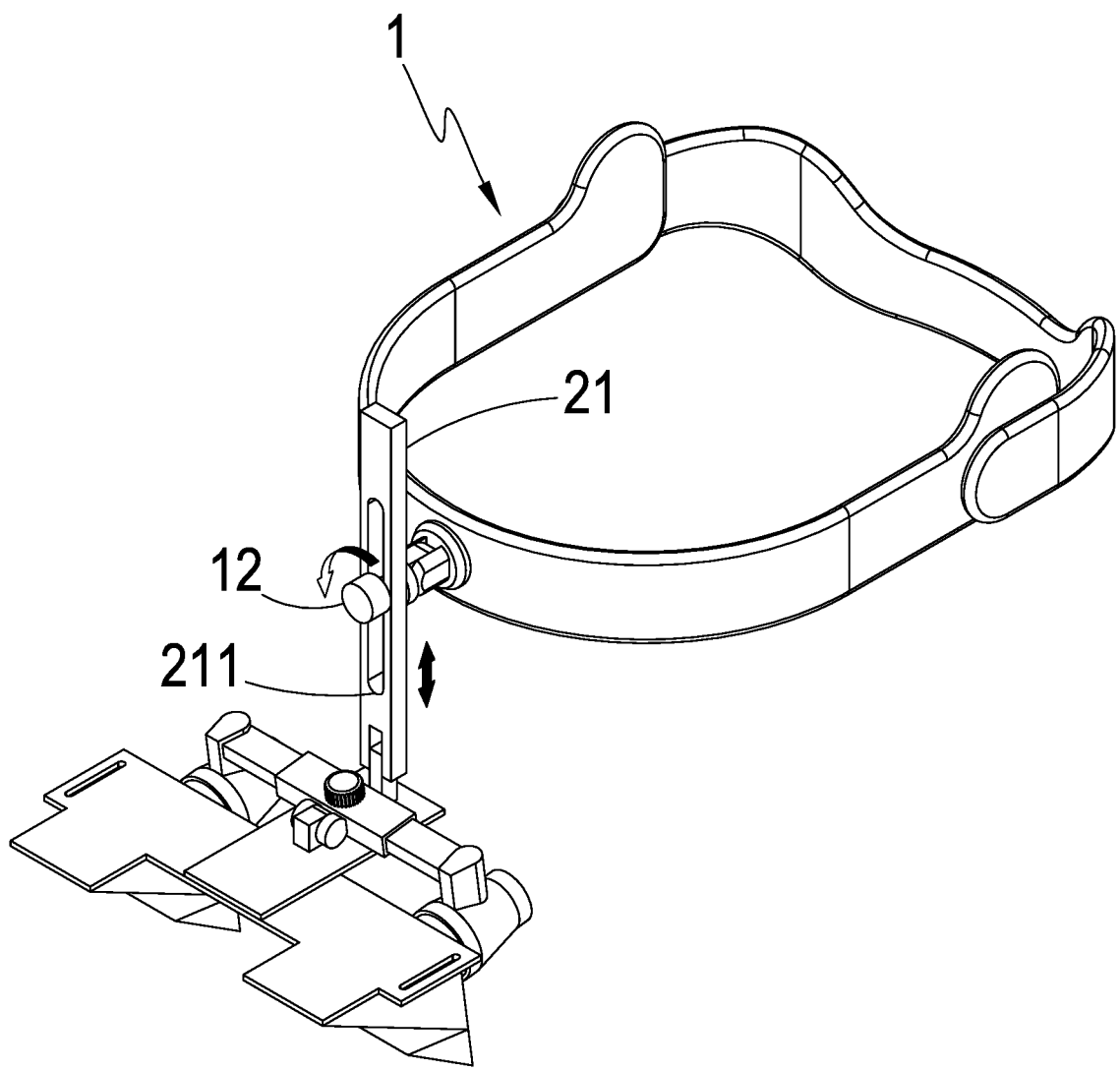
FIG. 7A is an adjustment positioning-piece schematic diagram 2 of the preferred embodiment.

Please refer to FIG. 2, FIG. 3, FIG. 7, and FIG. 7A; the wearing-piece 1 comprises a wearing-piece pivoting-portion 11 and a positioning-piece 12 pivotally set with the wearing-piece pivoting-portion 11; wherein the first bracket-body 21 has a fixing-portion 211 which can be fixed and set with the positioning-piece 12; in this way, when the user wants to adjust and change the angle of the first bracket-body 21 with respect to the eye of the user correspondingly, the angle between the wearing-piece pivoting-portion 11 and the positioning-piece 12 can be adjusted to achieve (as shown in FIG. 7); if the user wants to adjust the height of the magnifying-glass main-body 3 to correspond to the height of the eye of the user, the positioning-piece 12 can be loosened first; and the shaft-body in the positioning-piece 12 can be slid on the fixing-portion 211 (a long hole for the fixing-portion 211 is taken as an example in this embodiment); when the position to be adjusted is reached, the positioning-piece 12 is locked to tighten on the surface of the first bracket-body 21 to achieve the positioning effect; and which has the advantages of multi-axis multi-angle adjustment.

Figure 2:
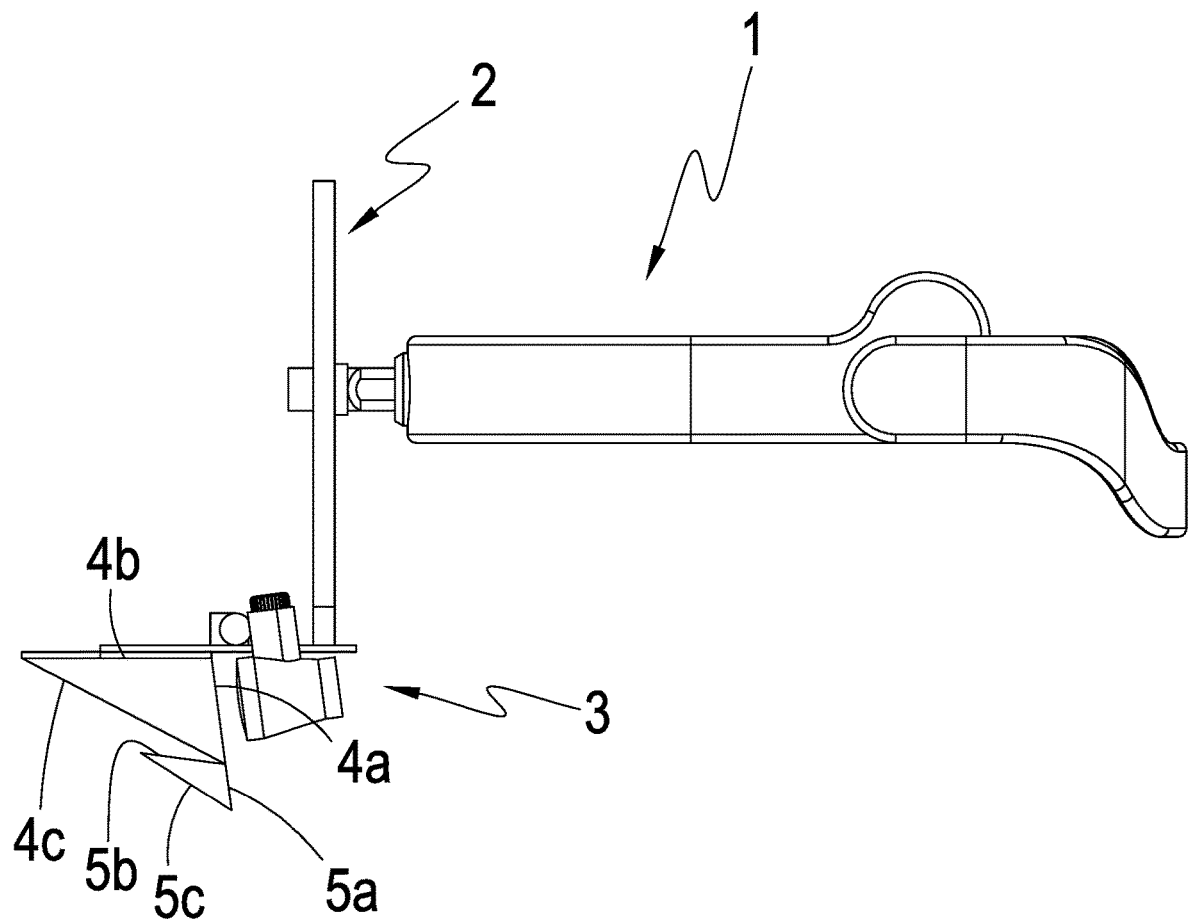
FIG. 2 is a side view of the preferred embodiment.
Figure 3:
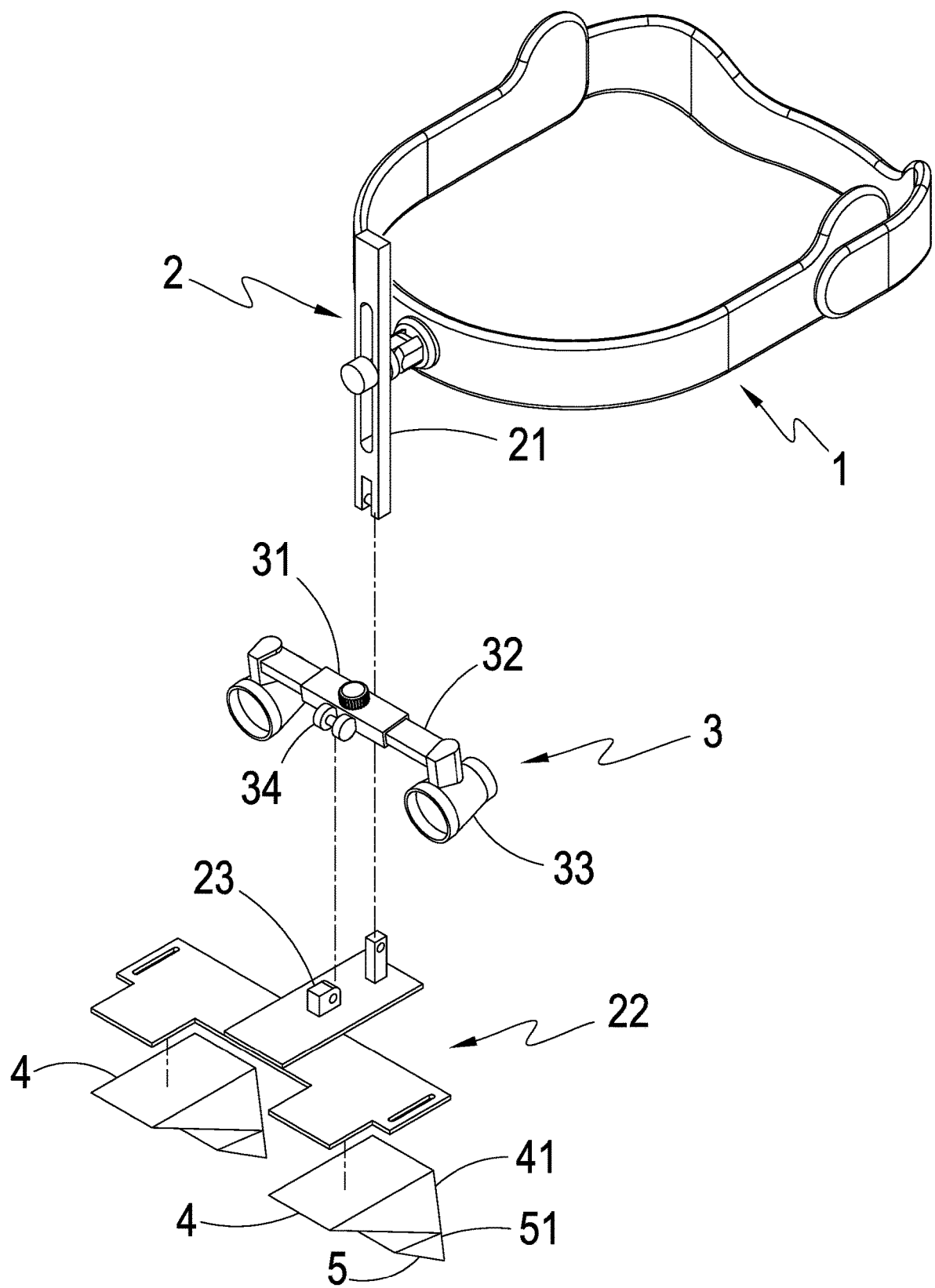
FIG. 3 is an exploded view of the preferred embodiment.
Figure 4:
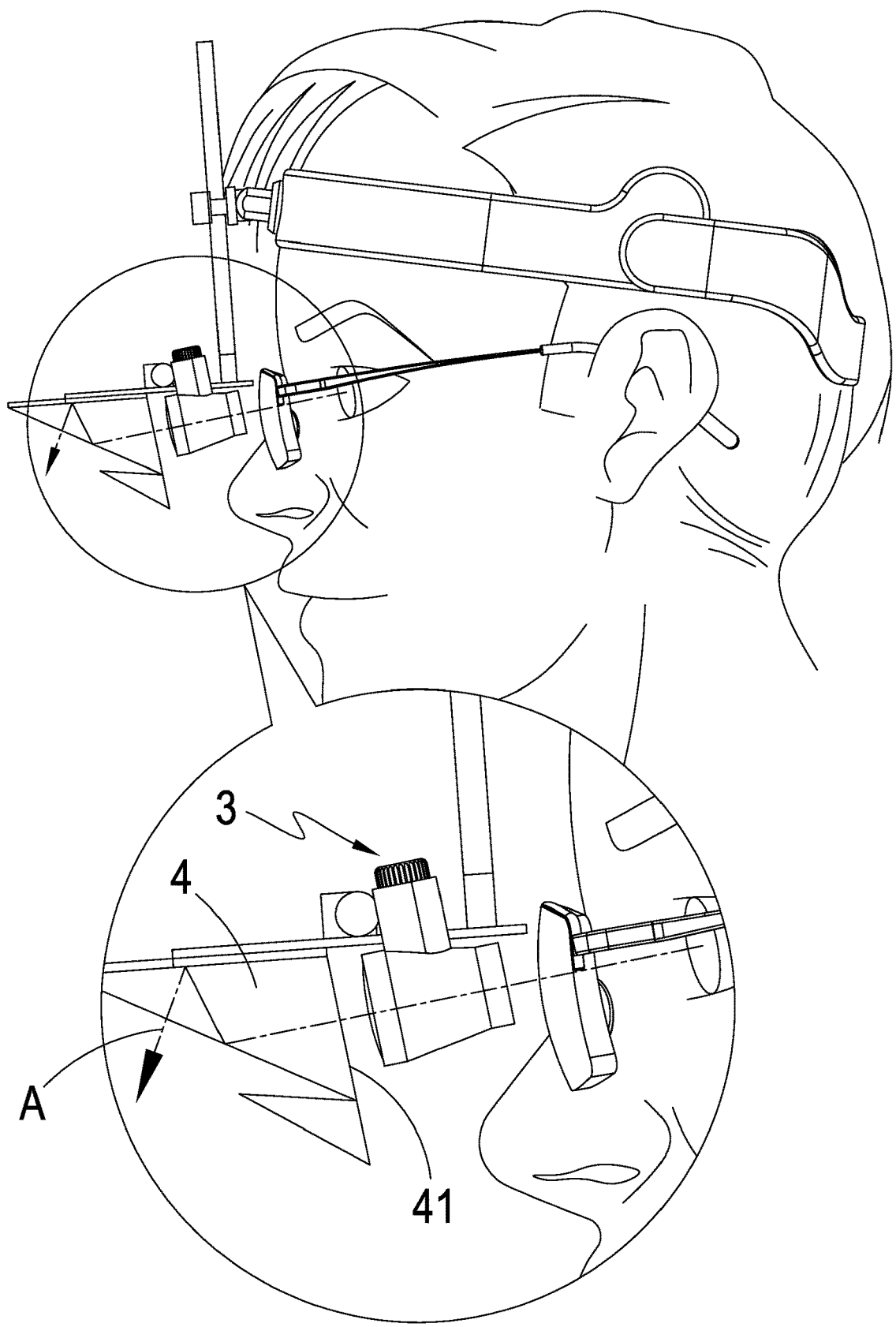
FIG. 4 is a use schematic diagram of the magnifying-glass main-body of the preferred embodiment.
Figure 8:
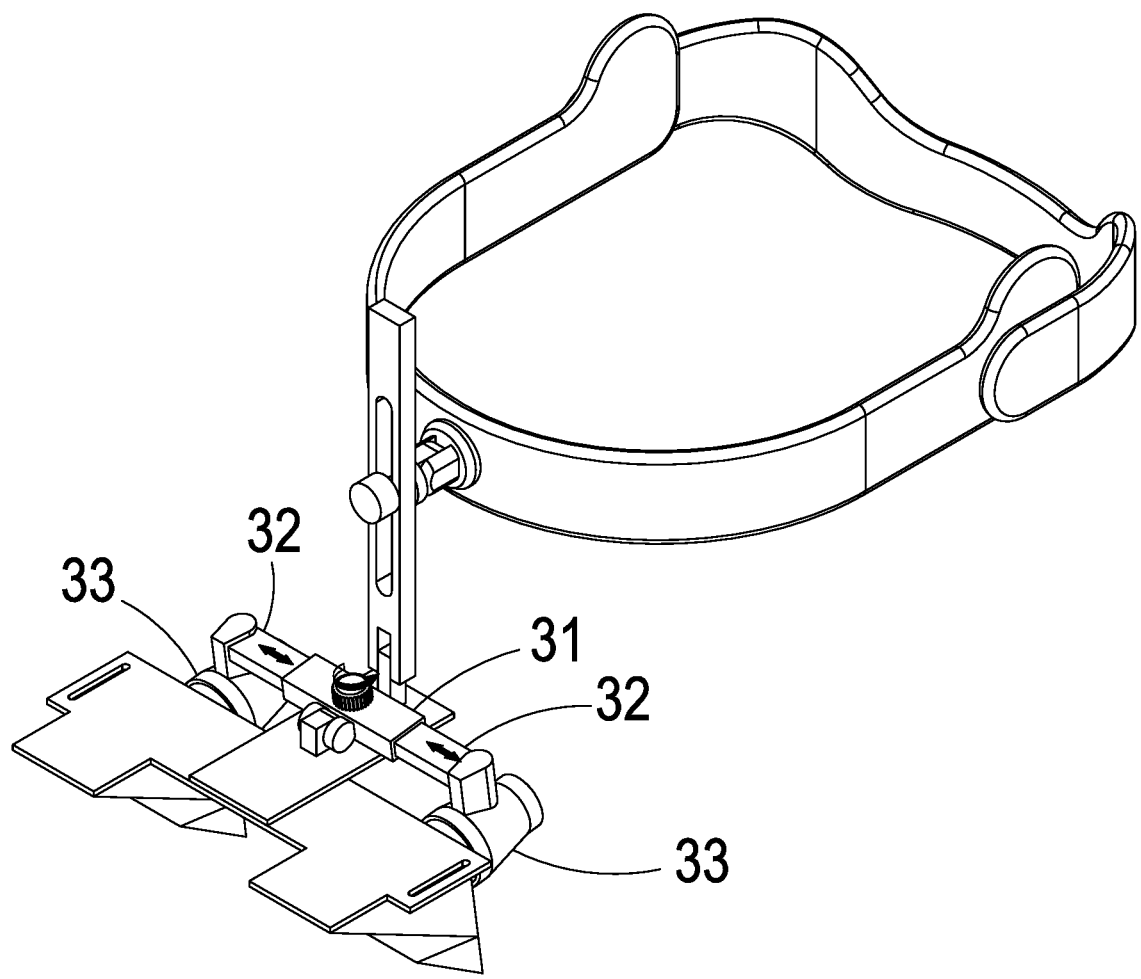
FIG. 8 is an adjustment extending-retracting piece schematic diagram of the preferred embodiment.

Please refer to FIG. 2, FIG. 3, and FIG. 8; when the user wants to adjust the spacing between the two magnifying-glass-bodies 33, the two magnifying-glass-bodies 33 can be extended or retracted by the extending-retracting piece 32 to adjust up to complying with the pupil distance of the user; wherein the relationship between the extending-retracting piece 32 and the magnifying-glass shell-body 31 is a track sliding design, which allows the magnifying-glass shell-body 31 to slide on the track in the magnifying-glass shell-body 31 to achieve an adjustment function and is more ergonomic.

Figure 9:
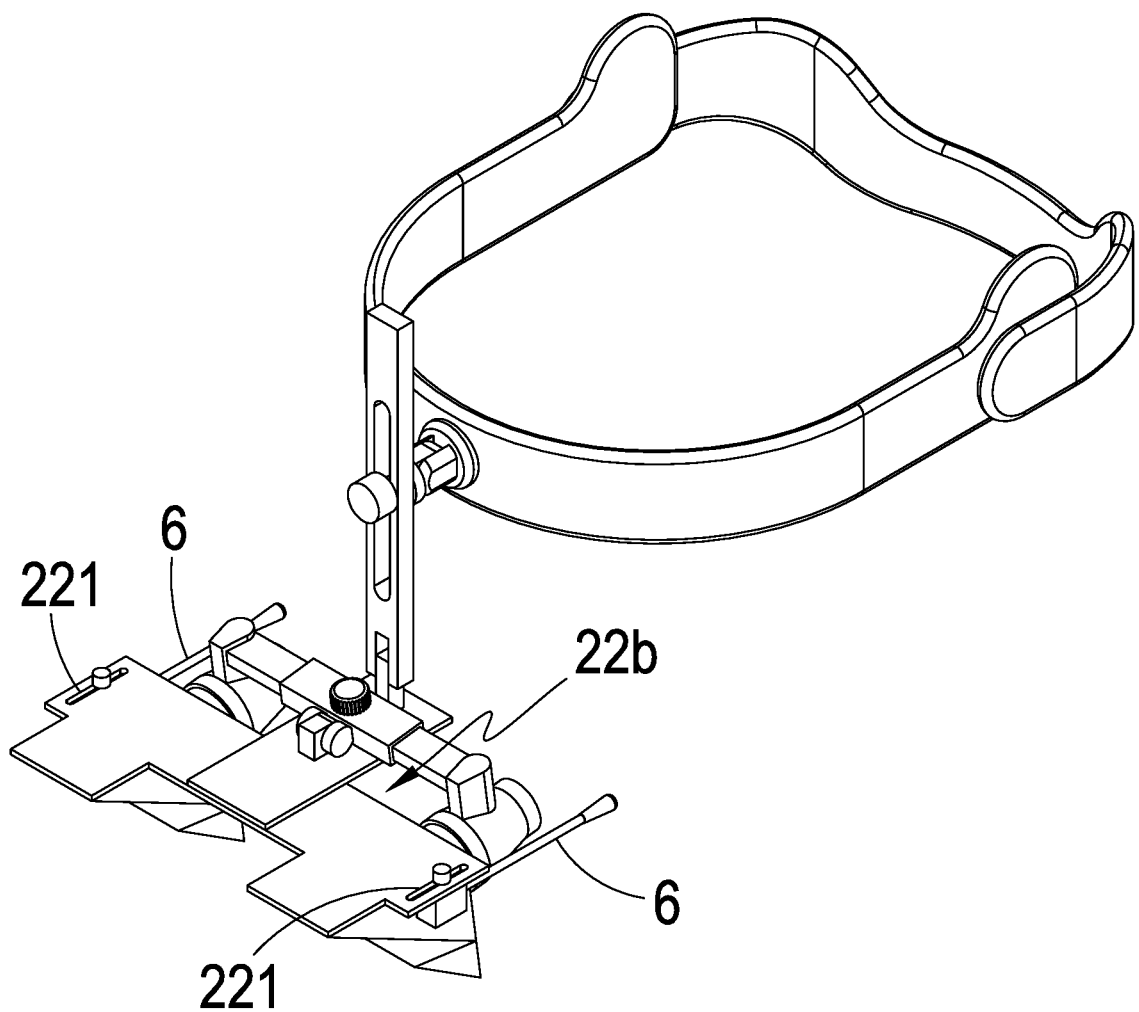
FIG. 9 is an adjustment abutting-holding piece schematic diagram of the preferred embodiment.

Please refer to FIG. 2, FIG. 3, and FIG. 9; each of the two sides of the second bracket-body 22 respectively has a through-hole 221 provided for a abutting-holding piece 6 to be movably set; when the user wants to use the abutting-holding piece 6 to support the whole weight of the present invention, the abutting-holding piece 6 can be loosen; at this time, the abutting-holding piece 6 can slide on the through-hole 221 until one end of the abutting-holding piece 6 is abutted against the user's glasses, and then the abutting-holding piece 6 is locked to tighten, and the user can use the abutting-holding piece 6 to abut and hold to form a fulcrum, so that the present invention cannot be hang down during the operation when the weight is too heavy.

Figure 10:
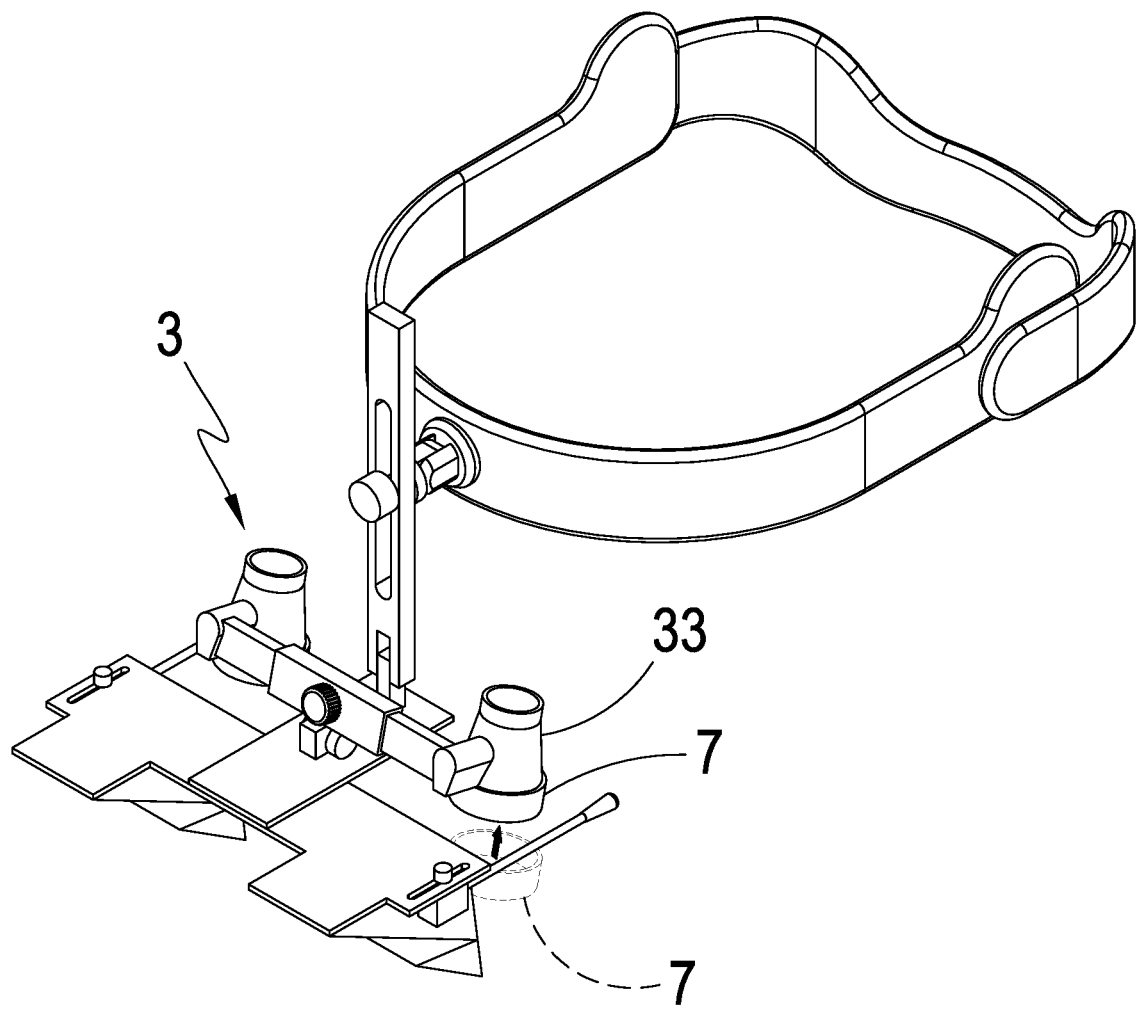
FIG. 10 is a use focusing-sheet schematic diagram of the preferred embodiment.

Please refer to FIG. 2, FIG. 3, and FIG. 10; a focusing-sheet 7 which can be freely combined or removed is set at one side of the magnifying-glass-body 33; thus, when the user buys a magnifying-glass main-body 3 with the focal length which does not meet his own need, a focusing-sheet 7 can be mounted on one side of the magnifying-glass-body 33 to change the focal length of the original magnifying-glass-body 33; and which will allow the user to additionally purchase a focusing-sheet 7 to cooperatedly adjust a focal length to meet his own need when buying a magnifying-glass main-body 3 with a wrong focal length.

It is worth mentioning that the focusing-sheet 7 can have a plurality of different focal length sections, and the user can select the focal length section complied with his own need at the purchase location; so that even if the focal length of the magnifying-glass-body 33 does not match, it is not necessary to re-purchase using a lot of money, thus having the big advantage of cost saving.

Figure 11:
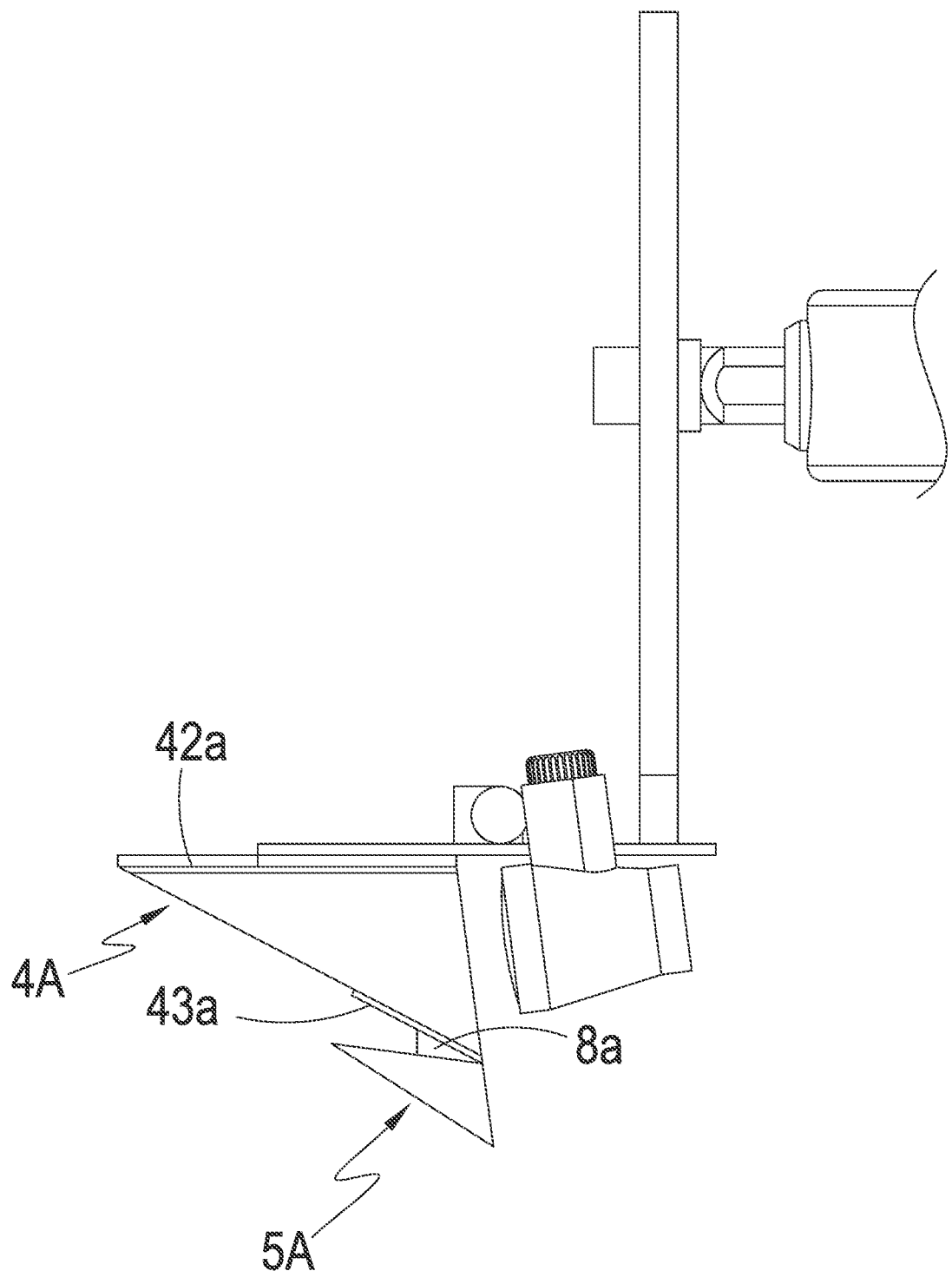
FIG. 11 is an implement schematic diagram of another preferred embodiment.

Please refer to FIG. 11, a first reflective layer 42A is set on the side of the bottom-edge of the first prism main-body 4, and a second reflective layer 43A is set on the oblique-edge of the first prism main-body 4; wherein a colloid 8A is set between the second reflective layer 43A and the second prism main-body 5 to mutually fix and set the first prism main-body 4 and the second prism main-body 5. Therefore, it can be known that the first prism main-body 4 and the second prism main-body 5 can be combined with each other by the adhesion technique of the colloid 8A; and through the design of the first reflective layer 42A and the second reflective layer 43A, which will allow the user to see more clearly when watching the field-of-view; and which is by the eyesight-line route reflected to the naked eye and pass through the first prism main-body 4 and the second prism main-body 5; wherein the first reflective layer 42A and the second reflective layer 43A of the present embodiment are an opaque coating-membrane as an example.

Figure 12:
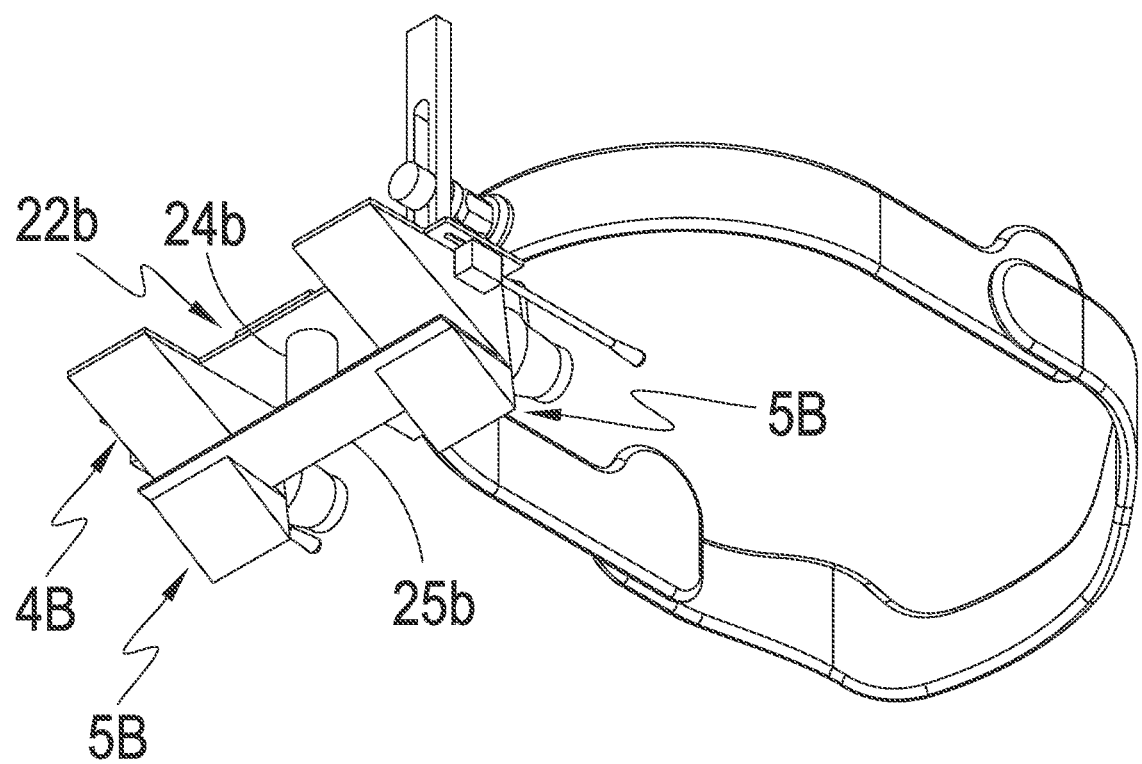
FIG. 12 is a stereoscopic schematic diagram of another preferred embodiment.
Figure 13:
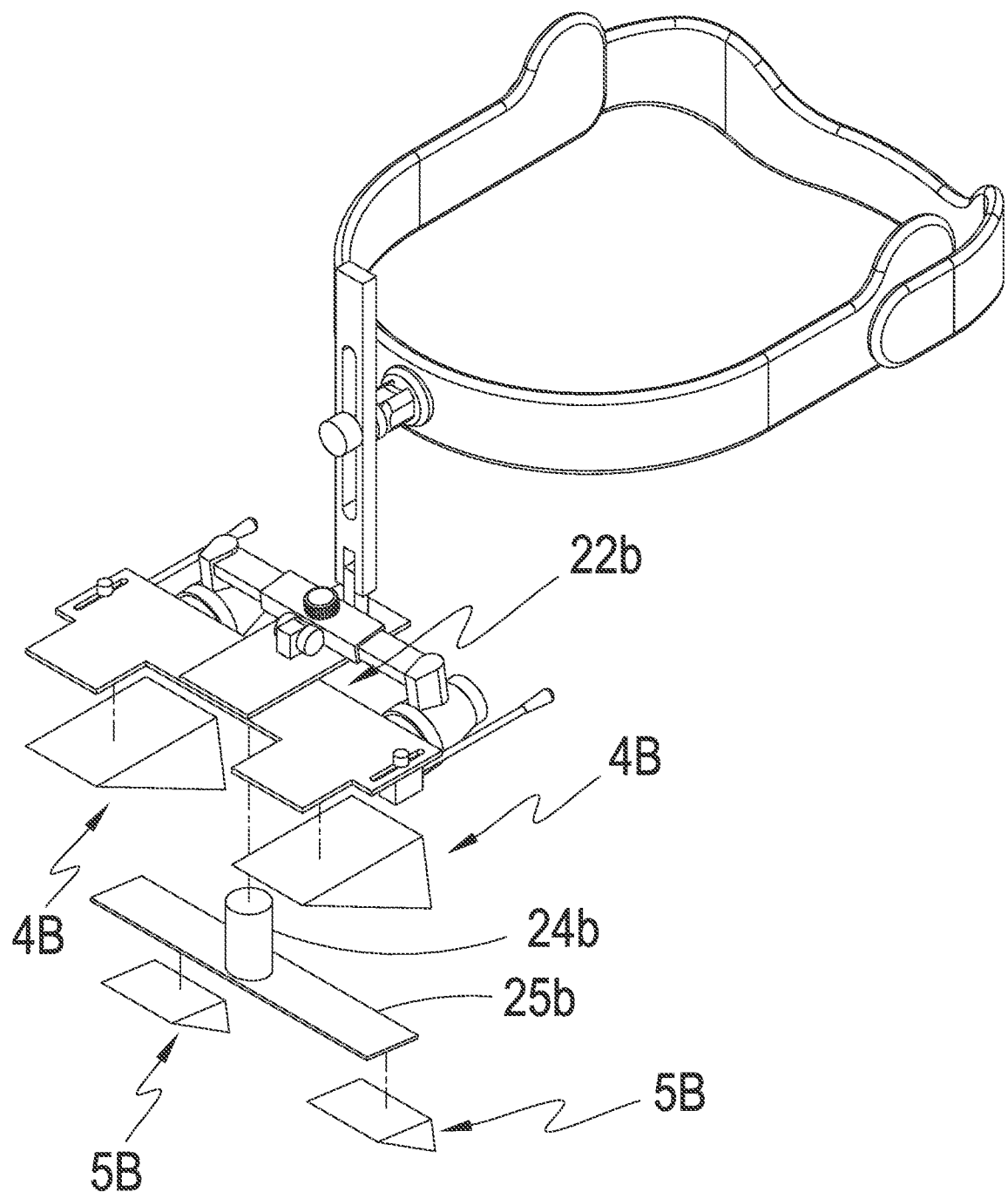
FIG. 13 is an exploded schematic diagram of another preferred embodiment.

Please refer to FIG. 12 and FIG. 13; the difference from the foregoing embodiment is that a third bracket-body 24B is further set at the bottom of the second bracket-body 22B, and a fourth bracket-body 25B is set at one side of the third bracket body 24B facing away from the second bracket-body 22B; wherein the fourth bracket-body 25B is combined with each of the second prism main-body 5; and, the combining way between the third bracket-body 24 and the second bracket-body 22B and between the third bracket-body 24B and the fourth bracket-body 25B can be bonding-combining or locking-fixing; thus, through the third bracket-body 24B and the fourth bracket-body 25B, the second prism main-body 5 can be stably set at one side of the first prism main-body 4; so as to be convenient for the user to use the present invention.

Therefore, the present invention has the following advantages:

1. The magnifying-glass main-body 3 can be flipped through the first pivoting-portion 23 to allow the user being able to select directly viewing the first facing-eye-surface 41 to watch a wide-angle field-of-view B1 by the first prism main-body 4; or, through the magnifying-glass main-body 3 to watch; in addition, when using the magnifying-glass main-body 3, the user can also simultaneously move the eye field-of-view to directly view the second facing-eye-surface 51 of the second prism main-body 5 and watch another wide-angle field-of-view, so as to achieve the advantage of freely transforming multiple field-of-view.

2. The positional relationship between the magnifying-glass main-body 3 and the first prism main-body 4 allows the user to watch the magnified field-of-view A1 in the magnifying-glass main-body 3 more clearly because the magnifying-glass main-body 3 is closer to the user's eye than the prior art; such that the area of the magnified field-of-view A1 is larger to allow the user to watch more clearly.

I claim:

1. A field-of-view transformation structure of a head-mounted magnifying-glass, which mainly comprises:
   a wearing-piece for the user to wear on the head;
   a supporting-assembly connected and set with the wearing-piece;
   a first pivoting-portion defined on the supporting-assembly;
   a magnifying-glass main-body provided for approaching the eye of the user to proceed watching, which is pivoted and set with the first pivoting-portion for the user to flip;
   a plurality of first prism main-bodies respectively set on the supporting-assembly and located at one side of the magnifying-glass main-body facing away from the wearing-piece; which define a first facing-eye-surface corresponding to the magnifying-glass main-body to cooperatedly set; and
   a plurality of second prism main-bodies respectively set at one side of the first prism main-body, which define a second facing-eye-surface disposed offset from magnifying-glass main-body;
   wherein the wearing-piece comprises a wearing-piece pivoting-portion and a positioning-piece pivotally set with the wearing-piece pivoting-portion; and
   wherein the supporting-assembly comprises a first bracket-body, a second bracket-body connected and set with the first bracket-body, and the second bracket-body has the first pivoting-portion and the first prism main-bodies.

2. The field-of-view transformation structure of a head-mounted magnifying-glass according to claim 1, wherein each of the two sides of the second bracket-body respectively has a through-hole provided for a abutting-holding piece to be movably set.

3. The field-of-view transformation structure of a head-mounted magnifying-glass according to claim 1, wherein the magnifying-glass main-body comprises a magnifying-glass shell-body, a plurality of extending-retracting pieces movably set on the magnifying-glass shell-body, and a plurality of magnifying-glass-bodies respectively set at two ends of the extending-retracting pieces, and one side of the magnifying-glass shell-body has a second pivoting-portion provided for the first pivoting-portion to pivotally set.

4. The field-of-view transformation structure of a head-mounted magnifying-glass according to claim 3, wherein one side of the magnifying-glass-body is set with a focusing-sheet which can be freely combined or removed.

5. The field-of-view transformation structure of a head-mounted magnifying-glass according to claim 1, wherein the first prism main-body has a bottom-edge, a short-edge, and an oblique-edge, and wherein the angle between the bottom-edge and the short-edge is 90 degrees to 120 degrees; the angle between the bottom-edge and the oblique-edge is 20 degrees to 32 degrees; and the angle between short-edge and the oblique-edge is 45 degrees to 65 degrees.

6. The field-of-view transformation structure of a head-mounted magnifying-glass according to claim 5, wherein a first reflective layer is set on the side of the bottom-edge of the first prism main-body, and a second reflective layer is set on the oblique-edge of the first prism main-body; wherein a colloid is set between the second reflective layer and the second prism main-body to mutually fix and set the first prism main-body and the second prism main-body.

7. The field-of-view transformation structure of a head-mounted magnifying-glass according to claim 1, wherein a third bracket-body is set at the bottom of the second bracket-body, and a fourth bracket-body is set at one side of the third bracket body facing away from the second bracket-body; wherein the fourth bracket-body is combined with each of the second prism main-body.

* * * * *